(12) United States Patent
Rougeot et al.

(10) Patent No.: US 12,152,703 B2
(45) Date of Patent: Nov. 26, 2024

(54) TENSIONER PADS FOR LAYING SUBSEA PIPELINES AND THE LIKE

(71) Applicant: Acergy France SAS, Suresnes (FR)

(72) Inventors: Jean-Baptiste Thierry Rougeot, Boulogne-Billancourt (FR); Aurelien Lagache, Nanterre (FR)

(73) Assignee: ACERGY FRANCE SAS, Suresnes (FR)

( * ) Notice: Subject to any disclaimer, the term of this patent is extended or adjusted under 35 U.S.C. 154(b) by 232 days.

(21) Appl. No.: 17/797,690

(22) PCT Filed: Feb. 3, 2021

(86) PCT No.: PCT/IB2021/000047
§ 371 (c)(1),
(2) Date: Aug. 4, 2022

(87) PCT Pub. No.: WO2021/156674
PCT Pub. Date: Aug. 12, 2021

(65) Prior Publication Data
US 2023/0089739 A1 Mar. 23, 2023

(30) Foreign Application Priority Data
Feb. 5, 2020 (GB) ..................................... 2001565

(51) Int. Cl.
*F16L 1/23* (2006.01)
(52) U.S. Cl.
CPC ..................................... *F16L 1/23* (2013.01)

(58) Field of Classification Search
CPC .. F16L 1/23; F16L 1/207; E21B 19/22; E21B 19/006
See application file for complete search history.

(56) References Cited

U.S. PATENT DOCUMENTS

| | | | | |
|---|---|---|---|---|
| 4,013,205 A | * | 3/1977 | Fabre-Curtat | B65H 51/14 226/173 |
| 6,439,445 B1 | * | 8/2002 | De Groot | B65H 51/14 226/176 |
| 9,671,044 B2 | * | 6/2017 | Alloway | F16L 1/23 |
| 2011/0188941 A1 | * | 8/2011 | Tame | F16L 1/23 405/166 |
| 2012/0177443 A1 | * | 7/2012 | Baylot | F16L 1/23 405/168.4 |

(Continued)

FOREIGN PATENT DOCUMENTS

CA 905845 A * 7/1972 ............. E21B 19/08

*Primary Examiner* — Benjamin F Fiorello
(74) *Attorney, Agent, or Firm* — MATTINGLY & MALUR, PC

(57) ABSTRACT

A pad for a track-type tensioner includes an interface layer made up of a plurality of rigid elements that together define a contact face of the pad for gripping a pipeline or other elongate product supported by the tensioner in use. A substrate layer of pliant material is sandwiched between a rigid base plate and the interface layer. The flexibility of the substrate layer supports the elements of the interface layer for movement relative to each other and relative to the base plate to suit an outer shape profile of the product. For example, by virtue of pivoting or translational movement of the rigid elements relative to the base plate, the same pads can adapt to different products that have different diameters.

27 Claims, 10 Drawing Sheets

(56) References Cited

U.S. PATENT DOCUMENTS

| | | | |
|---|---|---|---|
| 2014/0079486 A1* | 3/2014 | Argelli | F16L 1/23 |
| | | | 405/158 |
| 2016/0069478 A1* | 3/2016 | MacKinnon | F16L 1/235 |
| | | | 405/168.4 |
| 2019/0226604 A1* | 7/2019 | Righini | F16L 1/207 |
| 2019/0376619 A1* | 12/2019 | Vehmeijer | F16L 1/202 |

* cited by examiner

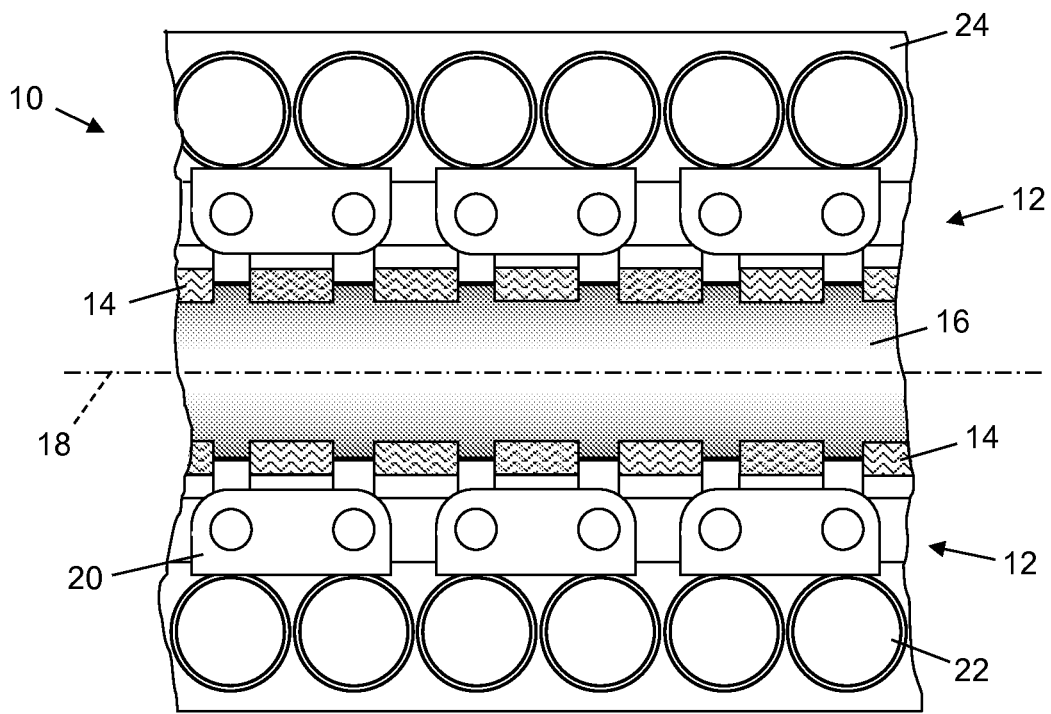
Figure 1
PRIOR ART
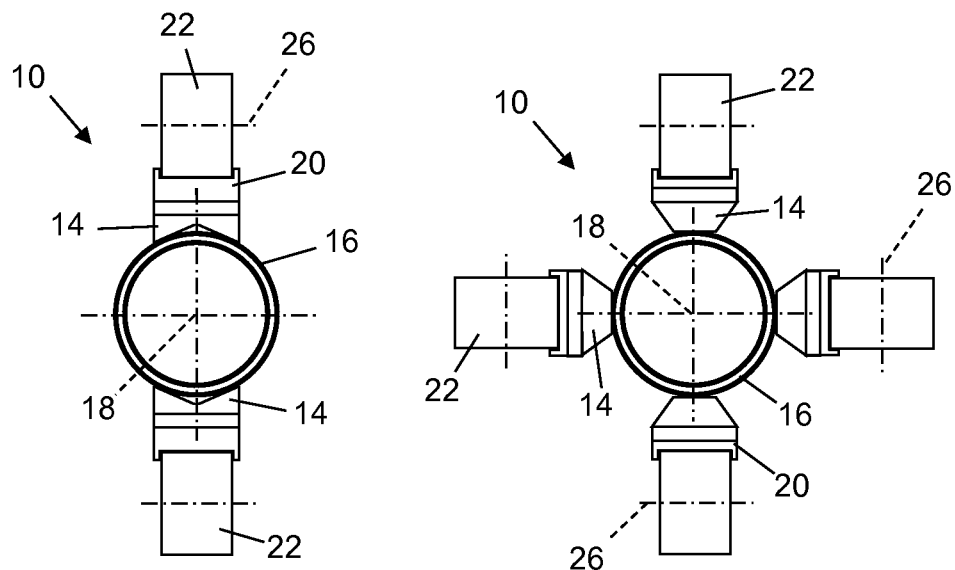
Figure 2
PRIOR ART
Figure 3
PRIOR ART

TENSIONER PADS FOR LAYING SUBSEA PIPELINES AND THE LIKE

This invention relates to tensioners for use offshore when laying subsea pipelines and other elongate products such as cables. The invention relates particularly to the challenges of increasing the hold-back force that a tensioner can apply to such a product. Thus, the invention relates to improving the grip of tensioner pads on the product, which also improves the safety and reliability of a track-type tensioner system.

This specification will exemplify the invention with reference to laying a pipeline, particularly a rigid pipeline, as used in the subsea oil and gas industry. However, it should be understood that the inventive concept can also be applied to laying other elongate products used in that industry, such as flexible pipes or umbilicals, or subsea cables as used in the fields of telecommunications and power transmission.

Various methods are known in the subsea oil and gas industry for installing rigid and flexible pipelines offshore, most commonly the methods known in the art as S-lay, J-lay and reel-lay. In each case, the pipeline hangs as a catenary between the pipelay vessel and the seabed under the tension of self-weight.

The weight of the catenary suspended between the pipelay vessel and the seabed is supported by a device aboard the vessel that applies hold-back force to the pipeline.

When laying large-diameter pipelines in deep water, a hold-back device may support a weight load of several hundred metric tons.

Various types of hold-back device are known. For example, the device may comprise a bushing that abuts and mechanically engages a hold-back formation of the pipeline, such as a collar. A friction clamp can also serve as a hold-back device, especially in vertical lay systems as used in J-lay operations.

The invention is particularly concerned with the most common type of hold-back device, namely track tensioners as exemplified in WO 98/50719. Such tensioners clamp a pipeline to apply hold-back force by friction while allowing the pipeline to be moved continuously and controlledly in either longitudinal direction. For this purpose, endlessly-looped articulated belts or caterpillar-type tracks squeeze the pipeline between them.

WO 98/50719 illustrates the conventional use of a jack system to displace the tracks and thereby to apply squeeze pressure to a pipeline. Each track is supported by a chassis that is connected to a support structure by swinging arms defining a parallelogram linkage. Hydraulic cylinders also extend between the support structure and the chassis. Thus, the chassis is movable relative to the support structure by the hydraulic cylinders, which lengthen to move the track into engagement with a pipeline as the arms of the linkage pivot in unison. Forces exerted on the chassis by the hydraulic cylinders generate the squeeze force that the track exerts on the pipeline.

With reference to FIGS. 1 to 3 of the drawings, a conventional tensioner 10 comprises two or more continuous tracks 12 that each comprise a longitudinal series of pads 14. The pads 14 define the interface between the mechanism of the tensioner 10 and the outer surface of a pipeline 16. Thus, the pads 14 have to transfer squeeze or clamp pressure and must also ensure that there is sufficient static friction to hold the pipeline 16 against longitudinal movement relative to the tensioner 10.

Maintaining static friction between the tensioner 10 and the pipeline 16 is essential. If allowed to begin, slippage of the pipeline 16 with respect to the tensioner 10 would be almost impossible to arrest. Slippage therefore presents a risk of serious injury to personnel on board a pipelay vessel, and a likelihood of catastrophic damage to the pipeline 16 and to equipment of the vessel.

At least two tracks 12 are in mutual opposition about the pipeline 16 squeezed between them as shown in FIGS. 1 and 2. Here, the pads 14 define concave interface surfaces bearing against the pipeline 16 so as to keep the pipeline 16 properly aligned with the longitudinal axis of the tensioner 10. Tensioner arrangements with three or four tracks equiangularly spaced around the firing line or launch axis of the pipeline 16 are also common. For example, FIG. 3 shows a tensioner 10 with four such tracks 12.

In each case, the tracks 12 turn in longitudinally-extending planes that intersect the central longitudinal axis 18 of the pipeline 16. This defines elongate interface areas extending parallel to the pipeline 16 where the pads 14 of the tensioners 10 are pressed inwardly into contact with the outer surface of the pipeline 16.

As best appreciated in FIG. 1, each track 12 comprises a chain of articulated track elements or links 20 that supports the pads 14. The track 12 circulates on an array of supporting rollers 22 that extends along the length of the interface area. The rollers 22 of the array are supported by a chassis 24, omitted from FIGS. 2 and 3, to turn on parallel and co-planar axes 26 that are orthogonal to, and lie in a plane parallel to, the central longitudinal axis 18 of the pipeline 16.

Hold-back force is applied by static friction between the outer surface of the pipeline 16, typically defined by a polymer coating or outer sheath of the pipeline 16, and the pads 14 that are mounted on the tracks 12. The pads 14 are generally made of a plastic or elastomeric material such as a polymer or rubber or are made of steel, or a combination of both, mounted on a back plate of steel or polymer that is fixed to a link 20 of a track 12 of the tensioner 10.

GB 2545680 describes an example of a tensioner pad, comprising two layers of polymer material, an elastomer surface and a polyamide support. Polymer-based pads like this are the most common solution but they are not suitable for vertical lay or where the required squeeze or clamping force is too great. In that case, the polymer can crush too much, the pad may be damaged and the cross-section of the pipeline may be distorted or ovalized.

For these reasons, steel pads, as exemplified in WO 2010/061280, are preferred for vertical lay or more generally for applications that require higher clamping pressure. The main drawback of steel pads is their stiffness or rigidity: they therefore have to be curved to complement a pipeline with a specific diameter and hence a specific matching radius of curvature. Consequently, when handling a succession of pipes with different diameters, the pads have to be changed between one pipe and the next. This can take several hours of vessel time.

The operational costs of pipelay vessels can run to hundreds of thousands of US dollars per day. Pipelaying is also vulnerable to a deterioration of weather conditions, which can force a pipelay operation to be suspended or aborted at enormous cost. Efforts have therefore been made to minimise or avoid any delay in swapping tensioner pads. For example, GB 2523914 shows a solution to cope with a change of pipeline diameter by adapting tensioner pads rather than removing and replacing them. U.S. Pat. No. 3,754,474 discloses a tensioner pad of rubber with metal studs embedded in the rubber to increase stiffness. However, such a pad cannot comply with a range of significantly different pipeline diameters.

GB 1506407 describes a friction shoe that includes a rigid casing housing a deformable member. Friction elements are mounted on the surface of the deformable member.

EP 0524648 describes an apparatus for injecting and withdrawing a length of flexible cylindrical tubing into and from a well bore. The apparatus comprises multiple gripper shoes that each include a pair of gripper elements mounted in a body of elastomeric material.

US 2004/188100 relates to gripper blocks for use in coiled tubing injection equipment used in the oil and gas industry. The gripper blocks each include a block body, a gripper plate and a flex layer disposed between the block body and the gripper plate.

WO 2016/186499 relates to a tensioner pad assembly that includes a carrier member and a pair of gripping members that can be mounted at multiple discrete positions on the carrier member.

GB 2325948 relates to an injection apparatus for injecting coiled tubing into a well bore. A gripper for use with the apparatus includes a gripper shoe that is mounted to a carrier. An elastomeric pad is sandwiched between the gripper shoe and the carrier.

Against this background, the invention provides a pad for a track-type tensioner, the pad comprising: a rigid base plate; an interface layer comprising a plurality of rigid elements that together define a contact face of the pad for gripping an elongate product supported by the tensioner in use; and a substrate layer of pliant material sandwiched between the base plate and the interface layer, the substrate layer supporting the elements of the interface layer for movement relative to each other and relative to the base plate. The contact face of the pad may, for example, be substantially planar in a rest state.

The elements of the interface layer may be elongate and aligned with each other side by side in a direction extending across the contact face. The elements of the interface layer may also be arranged in a two-dimensional matrix extending across the contact face. To give clearance for their relative movement, the elements of the interface layer preferably taper away from the substrate layer.

There may be elongate gaps between adjacent elements of the interface layer. In some embodiments, the base plate may be wedge-shaped, hence defining an inclined face that supports the substrate layer. In those embodiments, the elongate gaps between the elements of the interface layer may be aligned in a direction extending across a slope of the inclined face, or down a slope of the inclined face.

Gaps between adjacent elements of the interface layer suitably extend through the full thickness of the interface layer. The substrate layer may comprise slits in alignment and communication with the gaps. However, the substrate layer may extend continuously across the back plate between the elements of the interface layer.

The inventive concept extends to a track-type tensioner comprising a plurality of pads of the invention, the pads being spaced longitudinally in a direction parallel to a pipeline launch axis defined by the tensioner.

Where the elongate elements of the pads are elongate or disposed in an array, those elements may be aligned in a direction parallel to the pipeline launch axis and/or in a direction transverse to the pipeline launch axis.

Where the pads have wedge-shaped base plates, they may be arranged in opposed pairs with their base plates tapering toward each other.

The inventive concept also embraces a method of holding back an elongate product being laid into water. The method comprises: gripping the product with a plurality of pads of a track-type tensioner, each pad having a contact face defined by a plurality of rigid elements; and by virtue of squeeze force applied by the tensioner to the product via the pads, moving the rigid elements relative to each other and/or relative to base plates of the pads to suit an outer shape profile of the product. The contact faces of the pads may each be generally tangential to an outer curvature of the product.

Conveniently, the movement of the rigid elements may be permitted by distortion of a substrate layer that is disposed between the rigid elements and the base plate of each pad.

Movement of the rigid elements relative to the base plate may comprise rotation of the rigid elements about an axis parallel to a central longitudinal axis of the product. Such rotation of the rigid elements may change the inclination of the contact face relative to a diametric plane extending through the product. Movement of the rigid elements relative to the base plate may also, or instead, comprise translation of the rigid elements toward or away from the base plate.

Movement of the rigid elements relative to each other may cause the contact face to assume a concave profile, which profile suitably matches the outer curvature of the product.

Advantageously, the method of the invention may involve: gripping a first elongate product in the tensioner by applying squeeze force to the product via the pads; releasing the first product from the tensioner; and gripping a second elongate product in the tensioner by applying squeeze force to the second product via the same pads, wherein by virtue of said movement of the rigid elements, the pads adapt to the second product having a different diameter to the first product.

In summary, embodiments of the invention reside in a tensioner pad that comprises steel elements to enable increased squeeze force, but that can accommodate various diameters of pipeline without modification. The embodiments to be described are intended mainly for horizontal tensioners as used in S-lay operations but the inventive concept could, in principle, be applied to pads for vertical or inclined tensioners as used in J-lay or reel-lay operations.

More specifically, tensioner pads of the invention are composed of upper or outer solid or rigid blocks of metal such as steel or iron mounted on a layer or substrate of soft material, typically of polyurethane. Each solid upper block may have a toothed surface to provide the required friction.

The use of an underlying layer of soft material capped with an arrangement of two or more independent solid blocks allows enough flexibility of the assembly to maximise the contact surface with a pipeline. Beneficially, the same pads to be used for significantly different pipeline diameters without having to be swapped for different pads.

It has been found that using solid blocks to achieve holding capacity is more efficient than relying on standard polyurethane or rubber pads, providing a higher friction capacity and avoiding deterioration or contamination of the polyurethane or rubber during storage conditions. This also makes the coefficient of friction more consistent and so helps to predict the coefficient of friction more accurately.

Embodiments of the invention provide a pipe-laying pad that comprises: a shoe in a plastic material such as rubber, to be mounted on a support of the pad; and an interface in ductile metal such as cast iron on an upper side of the shoe, to be in contact with the pipeline, the interface comprising at least two and preferably at least three blocks or strips. In embodiments to be described, the plastic material has a first stiffness coefficient and the ductile metal has a second stiffness coefficient that is higher than the first stiffness coefficient.

The strips may conveniently be bonded to the underlying plastic material with an adhesive. Each strip may comprise a three-dimensionally patterned or textured surface to improve its grip on the pipeline or other elongate element being laid.

The strips may be oriented longitudinally, parallel to the axial direction of the pipeline, or may be oriented transversely, for example orthogonally with respect to the pipeline axis. When no pressure is applied to the pad, the strips are suitably in substantially the same plane, parallel to the upper surface of the shoe.

The strips are suitably arranged side-by-side to allow radial deformation of the pad assembly while limiting deformation other than squeezing in the transverse direction.

Also, the strips may each comprise a rounded lid, top or cover so that they can be articulated together when the soft plastic layer or shoe of the pad is squeezed or crushed.

In summary, the invention provides a pad for a track-type tensioner that comprises an interface layer made up of an array of rigid elements. Those elements together define a contact face of the pad for gripping a pipeline or other elongate product that is supported by the tensioner in use.

A substrate layer of pliant material is disposed between a rigid base plate and the interface layer. The flexibility of the substrate layer supports the elements of the interface layer for movement relative to each other and relative to the base plate to suit an outer shape profile of the product. For example, by virtue of pivoting or translational movement of the rigid elements relative to the base plate, the same pads can adapt to different products that have different diameters.

To put the invention into context, reference has already been made to FIGS. 1 to 3 of the accompanying drawings, in which:

FIG. 1 is a schematic side view of a tensioner arrangement known in the prior art, comprising caterpillar tracks that are opposed about a pipeline supported by a series of pads on the tracks;

FIG. 2 is a schematic cross-sectional view of a known tensioner arrangement; and FIG. 3 is a schematic cross-sectional view of a known variant of the tensioner arrangement shown in FIG. 2.

Figure 4:
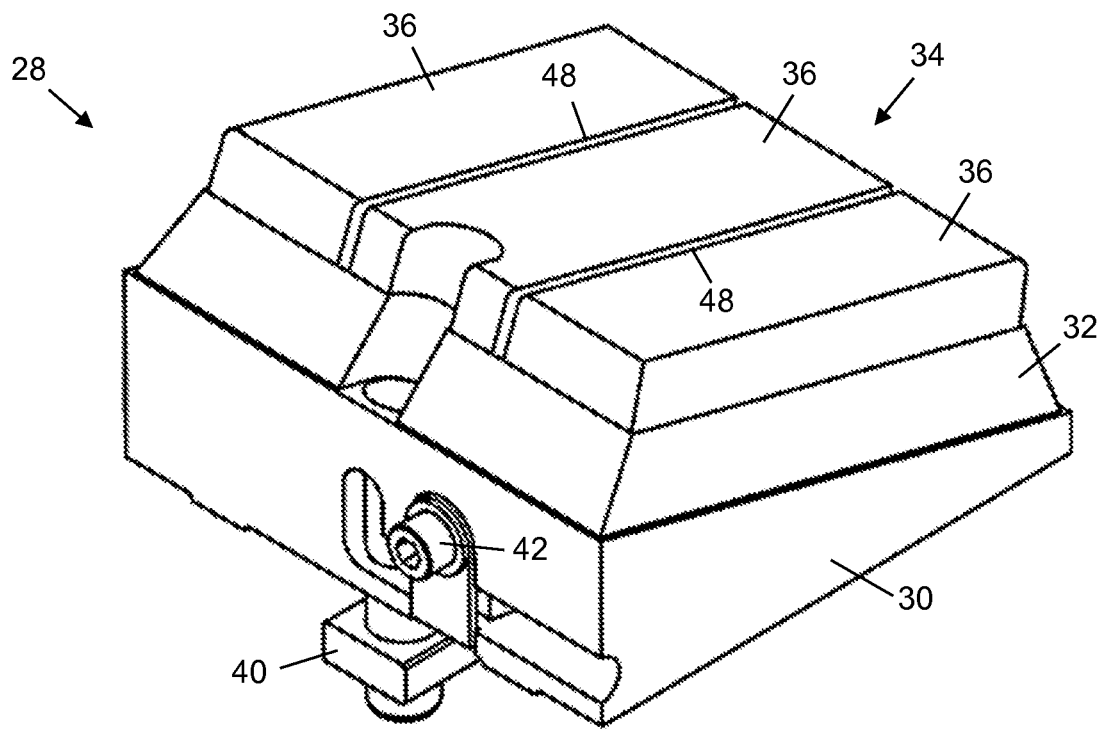
Figure 5:
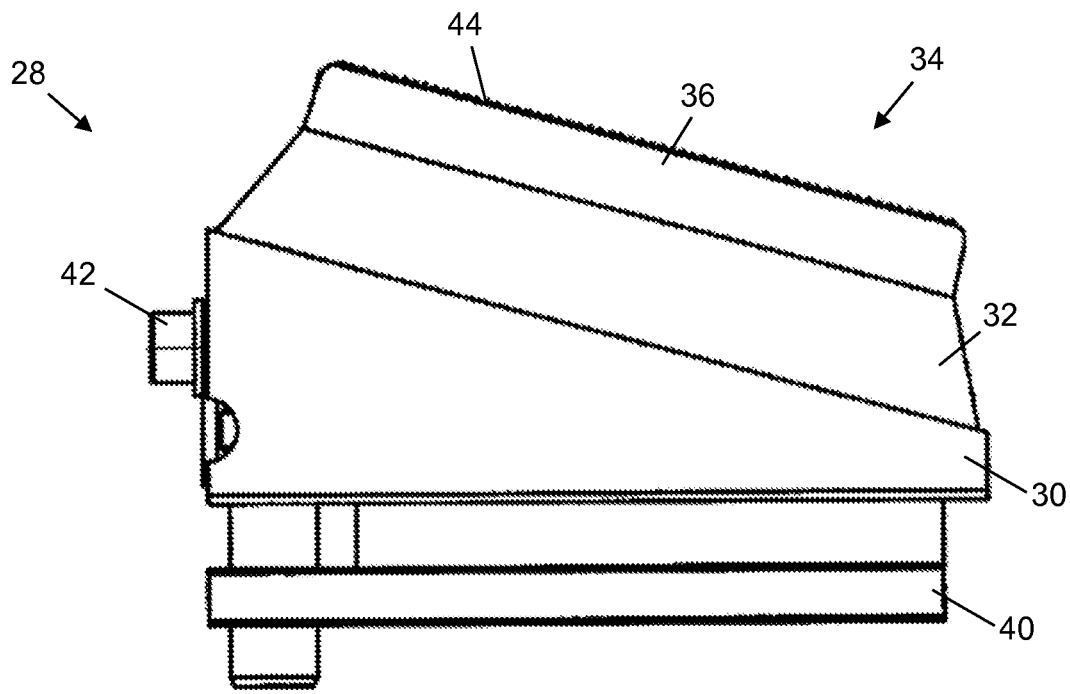
Figure 6:
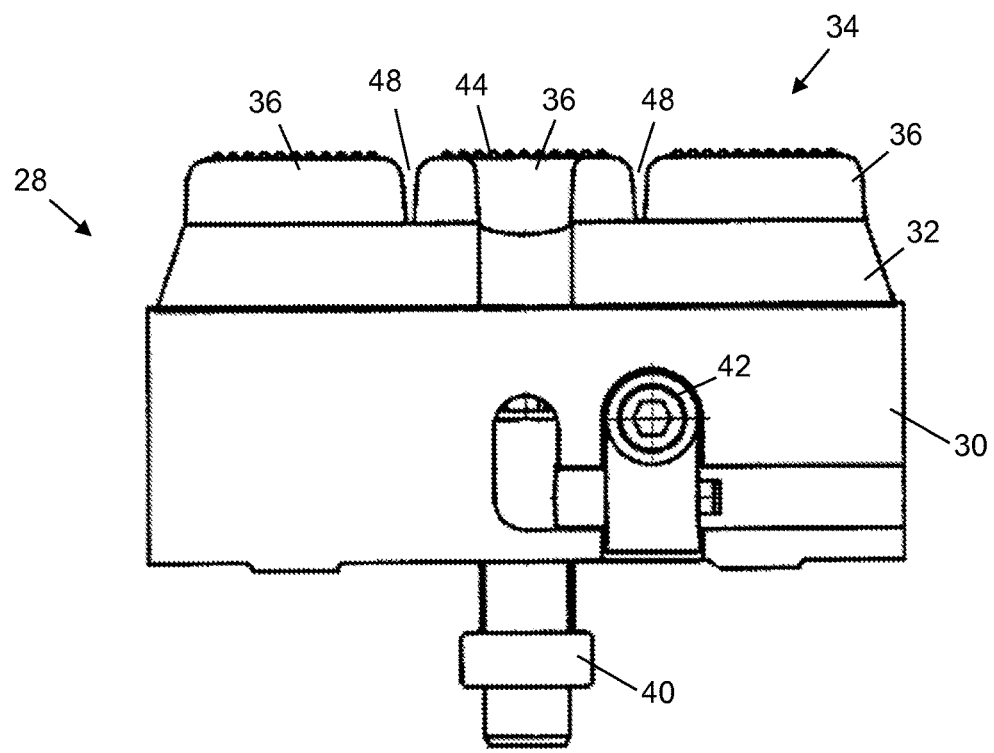
Figure 7:
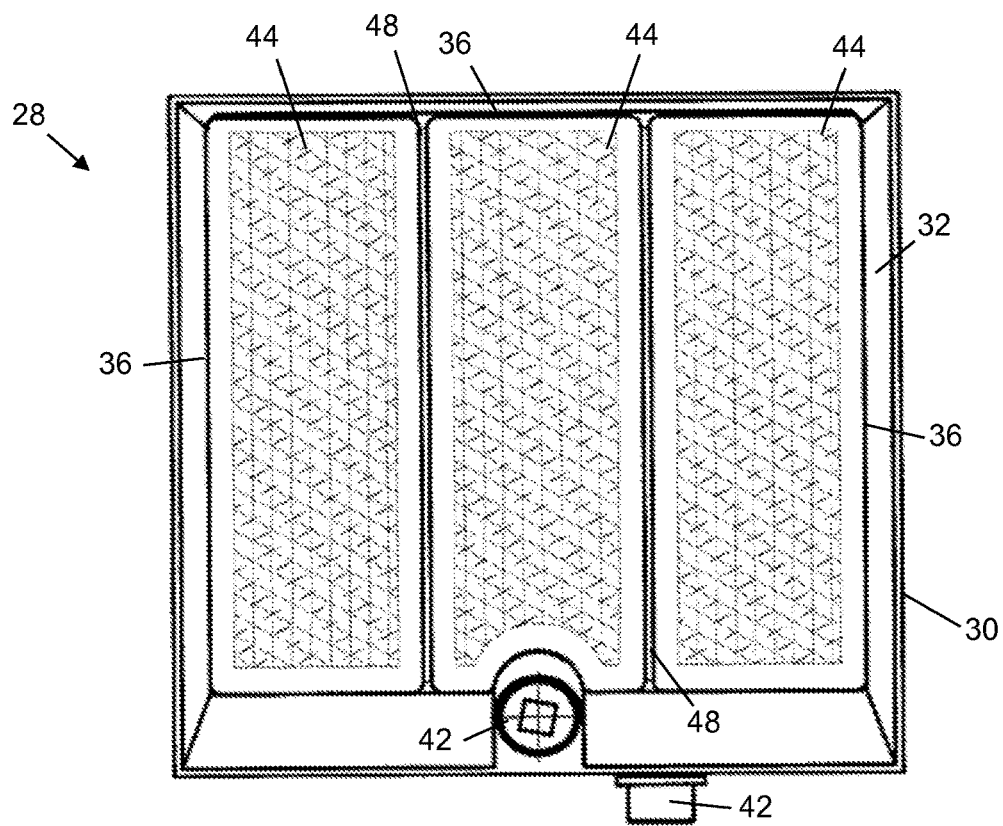
Figure 8:
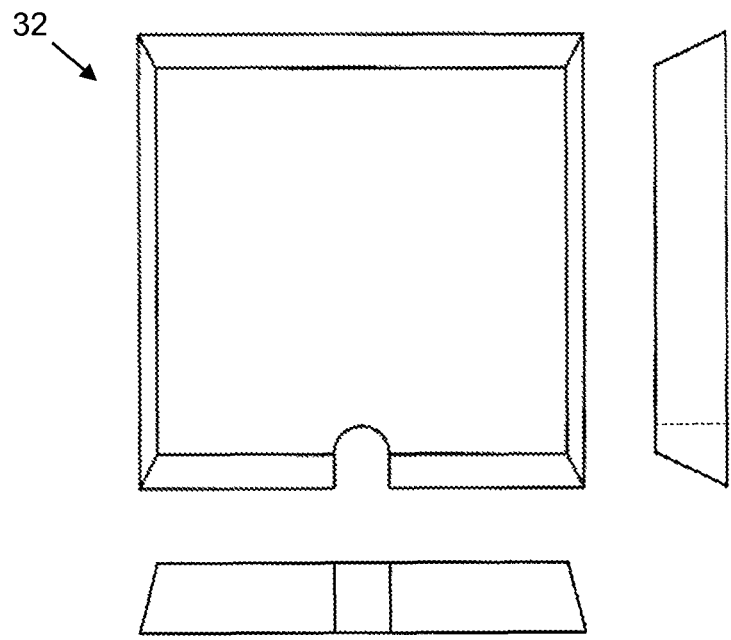
Figure 9:
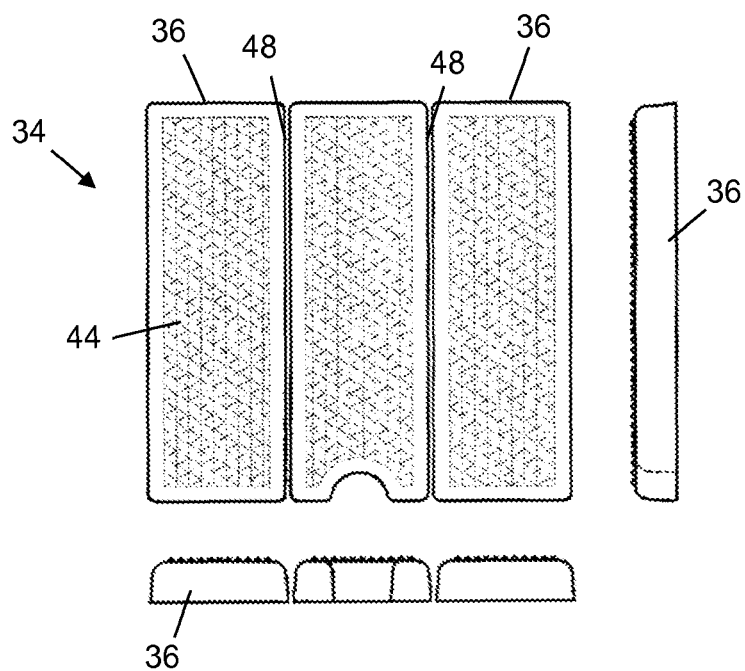
Figure 10A:
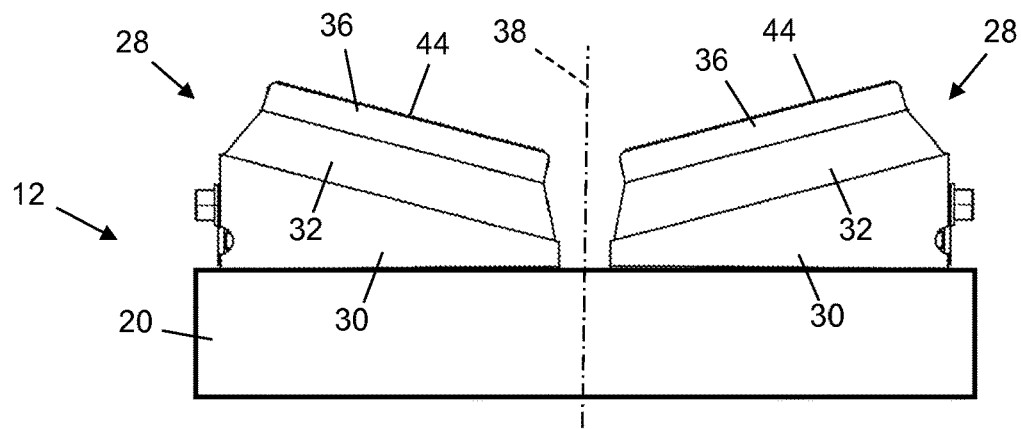
Figure 10B:
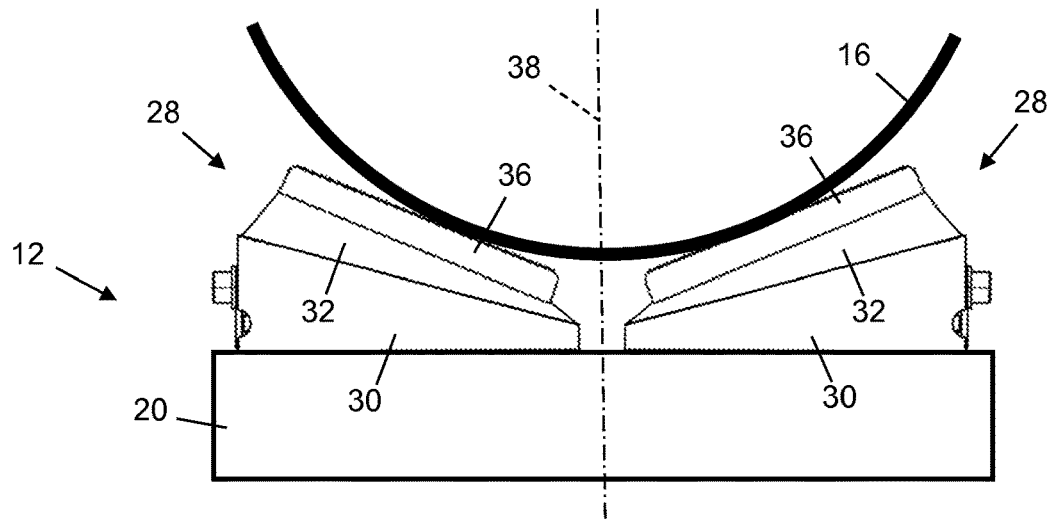
Figure 10C:
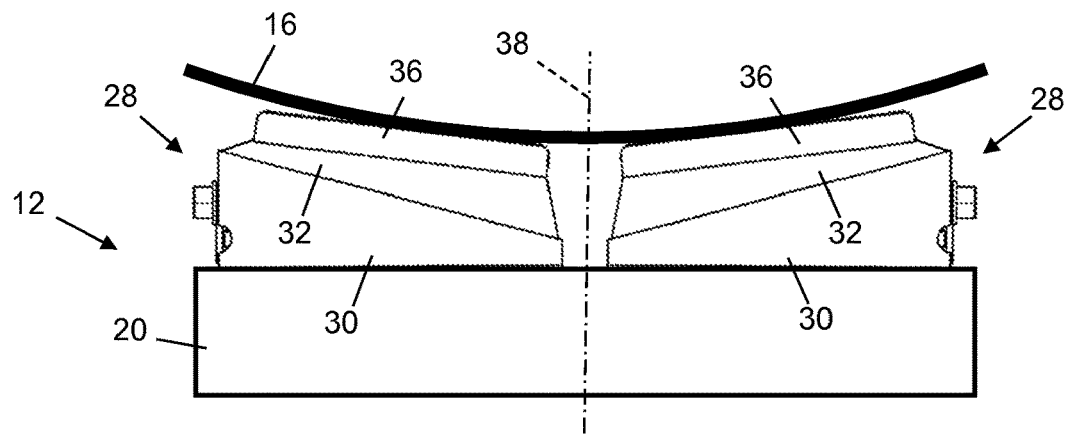
Figure 11:
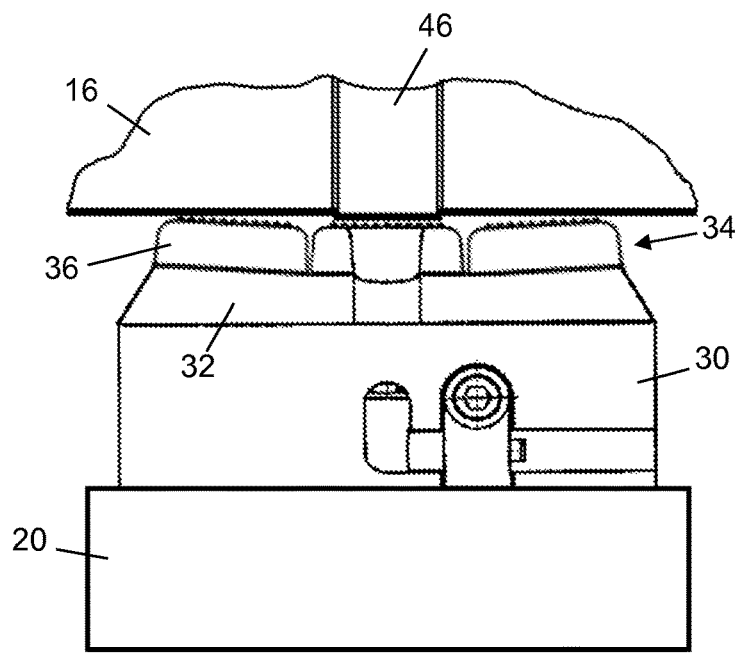
Figure 12:
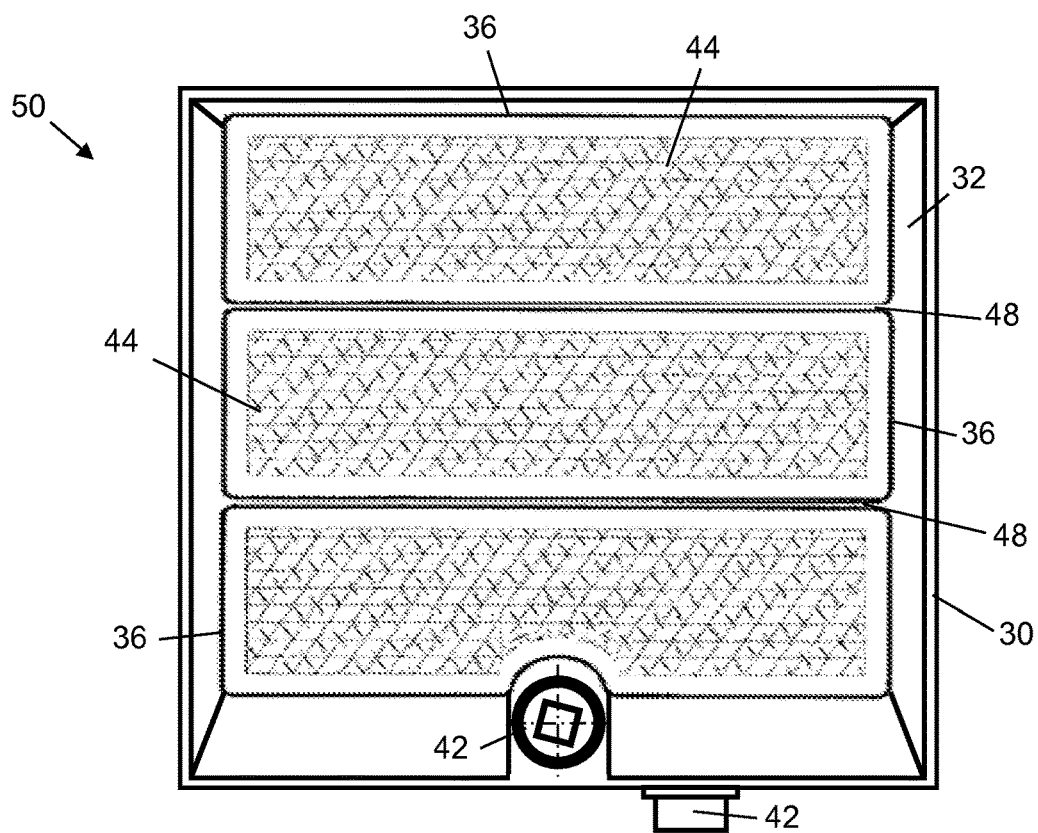
Figure 13:
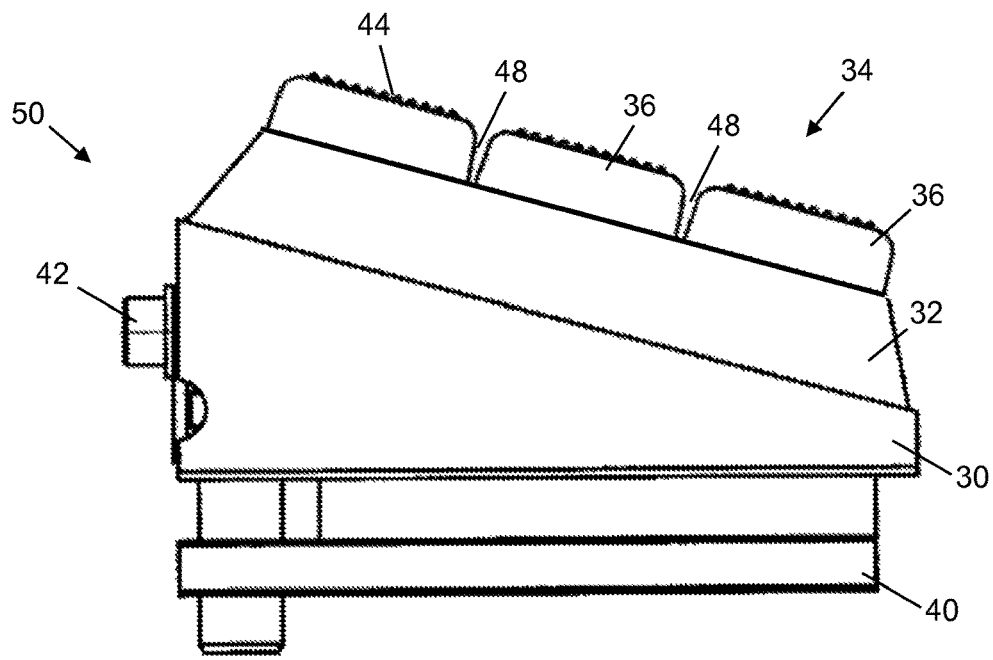
Figure 14:
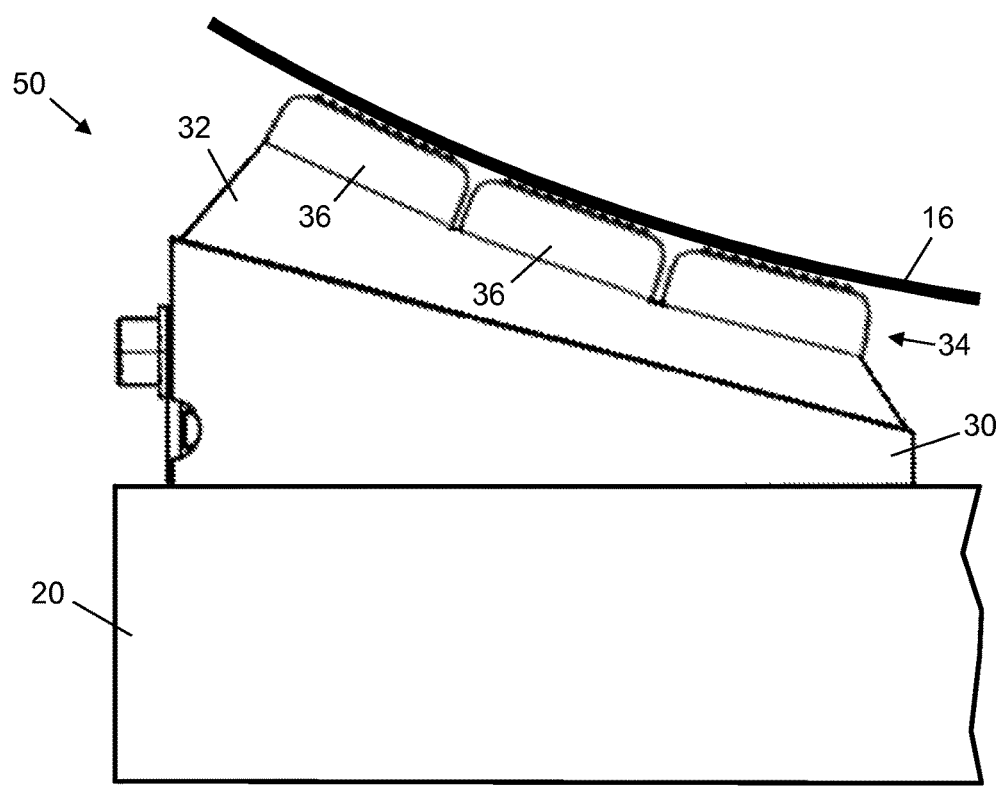
Figure 15:
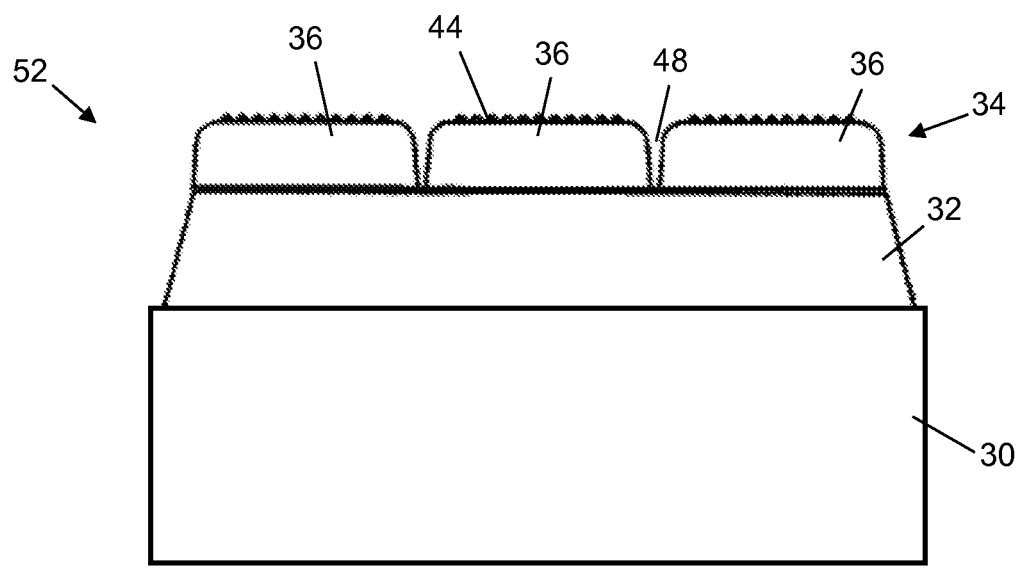
Figure 16:
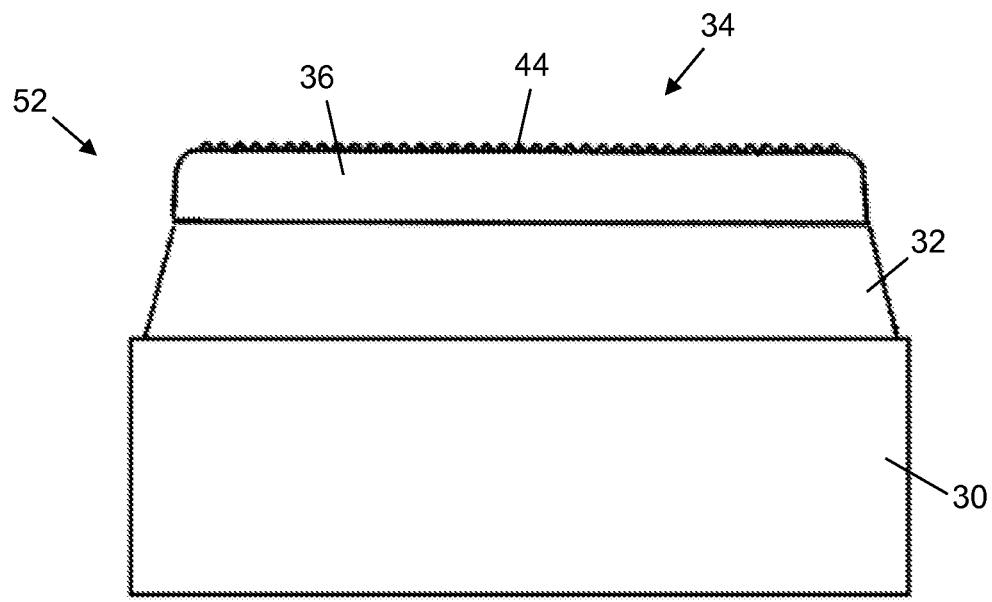
Figure 17:
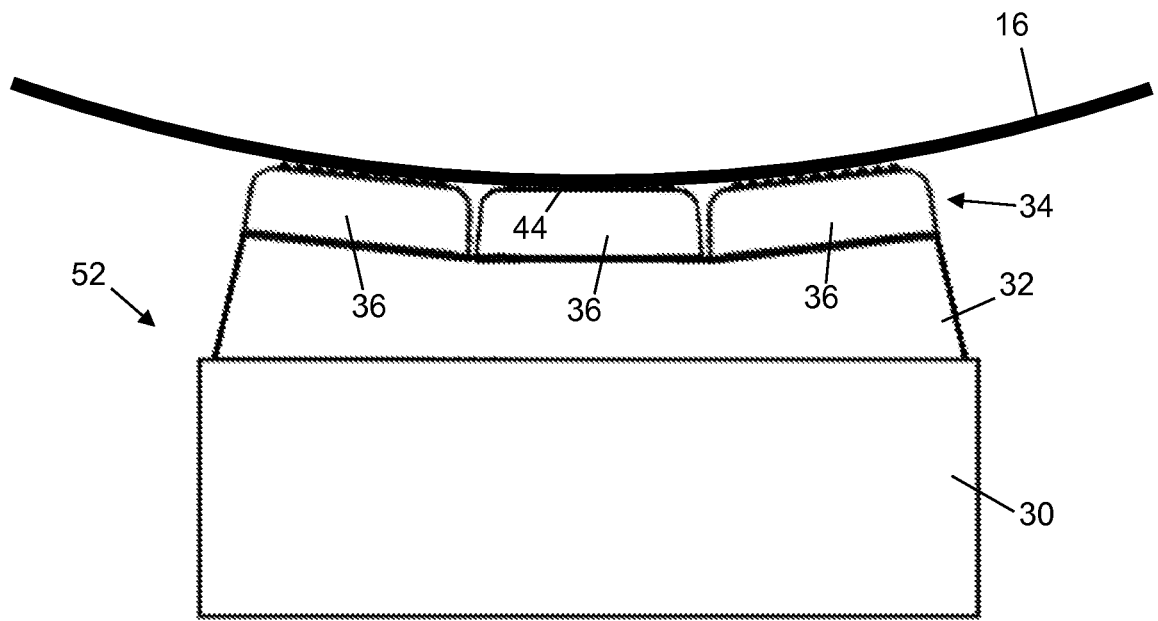
Figure 18:
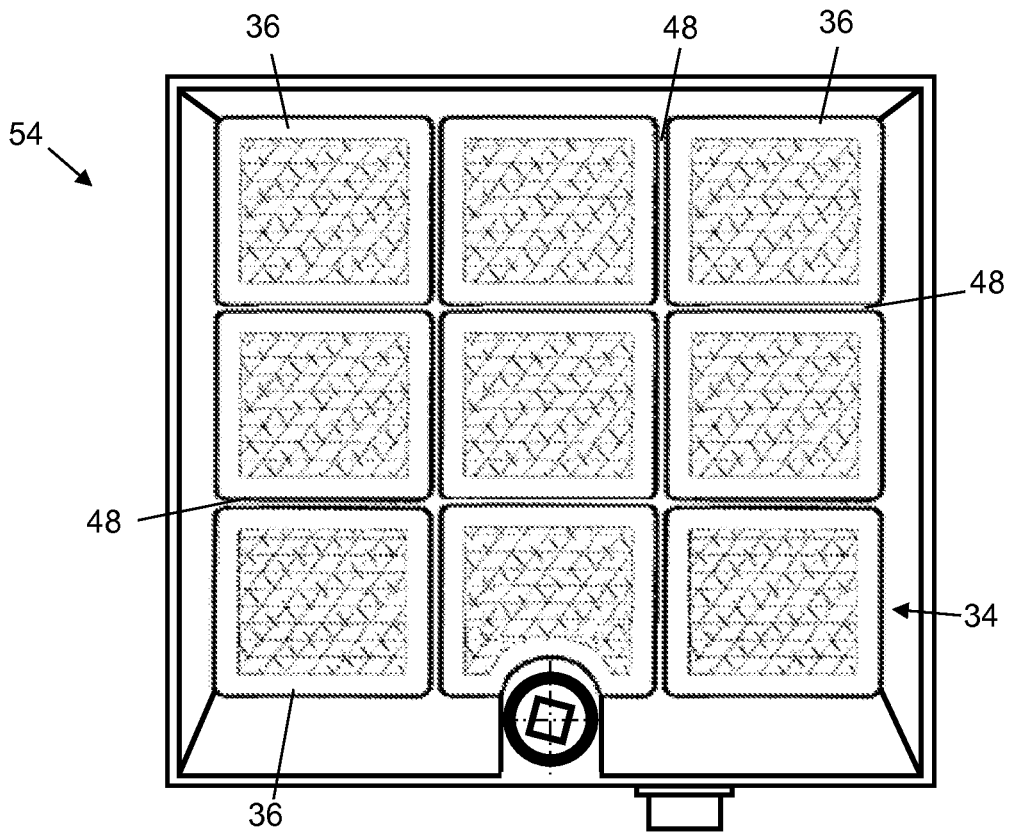
Figure 19:
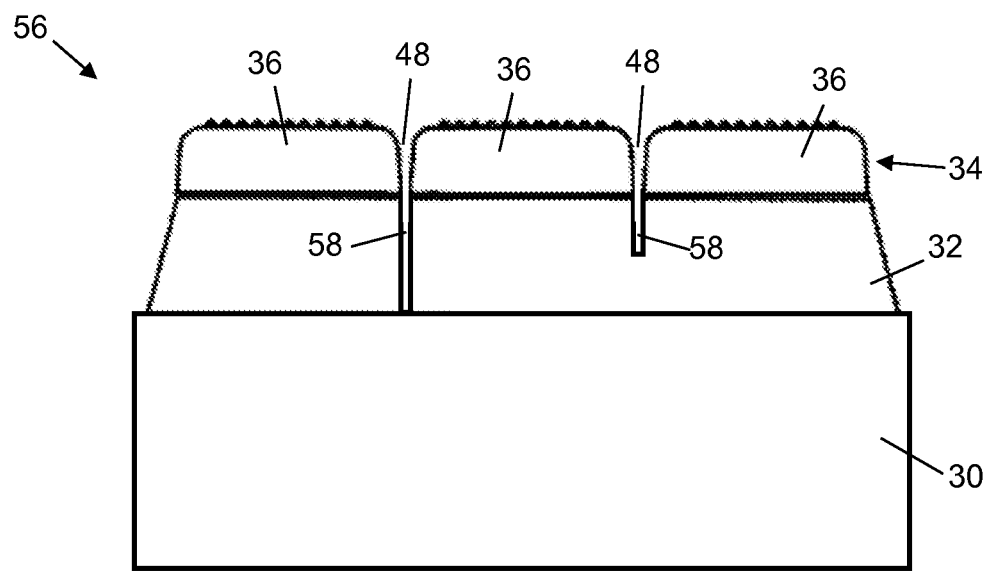

In order that the invention may be more readily understood, reference will now be made, by way of example, to the remainder of the accompanying drawings in which:

FIG. 4 is a perspective view of a tensioner pad of the invention;

FIG. 5 is a side view of the pad of FIG. 4;

FIG. 6 is an end view of the pad of FIGS. 4 and 5;

FIG. 7 is a top plan view of the pad of FIGS. 4 to 6;

FIG. 8 is a combination of a top plan view, side view and end view of a resilient substrate layer of the pad of FIGS. 4 to 7;

FIG. 9 is a combination of a top plan view, side view and end view of an array of metallic blocks forming an interface layer of the pad of FIGS. 4 to 7;

FIGS. 10a, 10b and 10c are schematic detail views of an opposed pair of the pads of FIGS. 4 to 7, showing how the substrate layers and the interface layers of the pads can adapt to suit pipelines of different diameters;

FIG. 11 is a schematic end view of one of the pads of the pair shown in FIGS. 10a to 10c, showing how the substrate layer and the interface layer can adapt to suit variations in the diameter of a supported pipeline;

FIG. 12 is a schematic top plan view of a first variant of the pad whose interface blocks are oriented differently to those of the pad of FIGS. 4 to 7;

FIG. 13 is a side view of the first pad variant of FIG. 12;

FIG. 14 corresponds to FIG. 13 but shows the first pad variant in use, showing how the substrate layer and the interface layer can adapt to suit the radius of curvature of a supported pipeline;

FIG. 15 is a schematic end view of a second pad variant;

FIG. 16 is a schematic side view of the second pad variant of FIG. 15;

FIG. 17 corresponds to FIG. 15 but shows how the substrate layer and the interface layer of the second pad variant can adapt to suit the radius of curvature of a supported pipeline;

FIG. 18 is a top plan view of a third pad variant;

FIG. 19 is a schematic side view of a fourth pad variant; and

Figure 20:
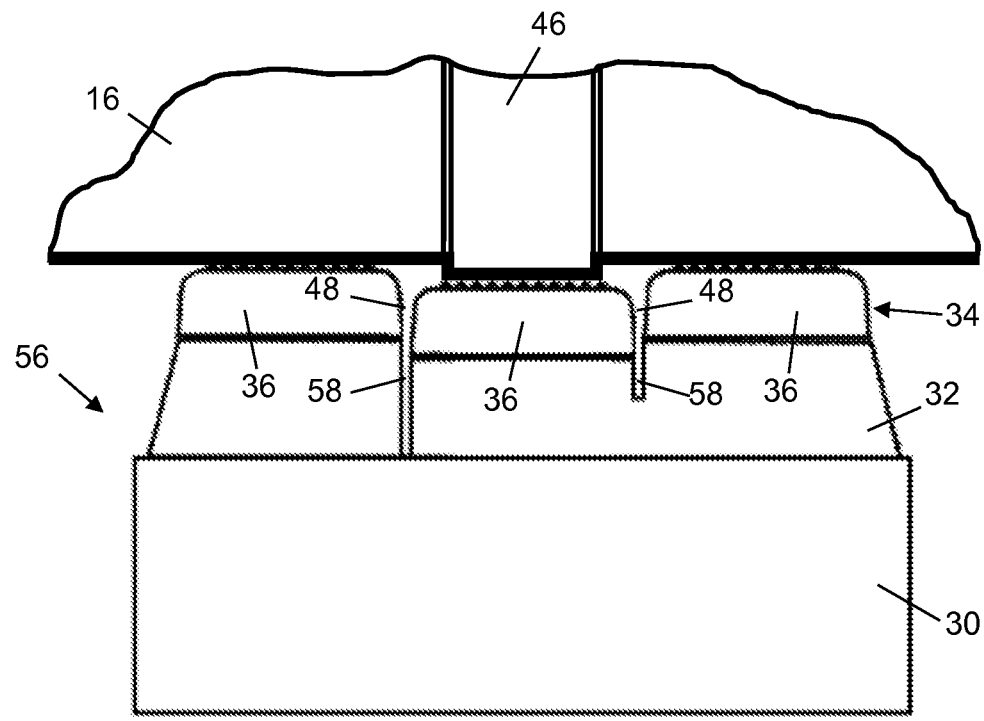

FIG. 20 corresponds to FIG. 19 but shows how the substrate layer and the interface layer of the fourth pad variant can adapt to suit variations in the diameter of a supported pipeline.

Referring next, then, to FIGS. 4 to 7 of the drawings, a tensioner pad 28 of the invention comprises a back plate 30, a substrate layer 32 and an interface layer 34. The substrate layer 32 is interposed between the back plate 30 and the interface layer 34 in a sandwich arrangement. The back plate 30, the substrate layer 32 and the interface layer 34, and hence the pad 28 as a whole, each have two mutually-orthogonal pairs of parallel sides, hence being substantially rectangular in plan view as shown in FIG. 7.

The substrate layer 32 is made of a pliant, preferably resilient material such as polyurethane. Conversely, the back plate 30 and the interface layer 34 are made of a rigid material such as a metal. However, the interface layer 34 comprises rigid elements 36 that can move relative to each other, and relative to the back plate 30, due to the flexibility of the supporting substrate layer 32. This articulation of and between the elements 36 confers flexibility on the interface layer 34 as a whole, as distinct from the rigid material from which the elements 36 of the interface layer 34 are made.

The substrate layer 32 and the interface layer 34 are shown in isolation in FIGS. 8 and 9 respectively. FIGS. 10a to 10c show a pair of the pads 28 in mutual opposition about a central plane 38 that contains the central longitudinal axis 18 of the pipeline 16 being laid.

When the pad 28 is incorporated into a tensioner track 12 in use, the back plate 30 is fixed directly or indirectly to the links 20 of the track 12. Conversely, the interface layer 34 faces the launch axis to be brought into frictional contact with the outer surface of the pipeline 16 being laid.

The back plate 30 shown here is configured for direct attachment to a link 20 of an articulated track 12, as shown in FIGS. 10a to 10c. For this purpose, the back plate comprises conventional attachment formations 40 on its underside and screws 42 for securing and locking the tensioner pad 28.

In this example, the back plate 30 is wedge-shaped, with substantially flat upper and lower major faces that converge with each other toward one end. Thus, the back plate 30, and hence the pad 28 as a whole, tapers toward an opposed similar pad 28 that is disposed in mirror image on a link 20 of a tensioner track 12 as shown in FIGS. 10a to 10c.

The mutually-opposed pads 28 form a pair. A series of such pairs of pads 28 spaced longitudinally along the tensioner track 12 forms an elongate concave formation or groove for supporting the pipeline 16 as shown in FIGS. 10b and 10c, hence being best suited for use in a twin-track tensioner arrangement as shown in FIG. 2.

The link 20 of the tensioner track 12 is shown as planar in FIGS. 10a to 10c for ease of illustration. Other geometrical variations are known in the art, for example V-shaped links. The arrangement of pairs of pads 28 shown in FIGS. 10b and 10c can be adapted as required by the shape of the link 20 without departing from the invention. Similarly, a unique pad 28 can be mounted on the link 20 or on an intermediate piece designed as a shape adaptor for the link 20.

The substrate layer 32 is of substantially uniform thickness and has a chamfered edge such that the substrate layer 32 has a frusto-pyramidal shape that tapers toward the interface layer 34.

In this example, the interface layer 34 comprises three rigid elongate elements 36 in the form of strips that lie beside each other in parallel orientation, all extending parallel to the inclination of the back plate 30, hence extending up and down the slope defined by that inclination. Thus, the elements 36 extend in a direction that intersects the diametric plane 38 containing the central longitudinal axis 18 of the pipeline 16.

The elements 36 of the interface layer 34 are substantially cuboidal rigid blocks of steel or iron and are bonded to the underlying substrate layer 32 that supports them. The elements 36 are of substantially uniform and identical thickness between the substrate layer 32 and their exposed contact faces 44. Thus, when in a rest state without pressure applied to them, the contact faces 44 of the elements 36 lie in a common plane that is parallel to the substrate layer 32 and hence to the inclined face of the back plate 30. The contact face 44 of each element 36 is shaped with a three-dimensional pattern or texture to improve its grip on the pipeline 16.

As noted above, the flexibility of the supporting substrate layer 32 provides for relative movement or articulation of the elements 36 of the interface layer 34 relative to the back plate 30 and relative to each other. For example, as shown in FIGS. 10b and 10c, the elements 36 of the interface layer 34 can pivot together relative to the back plate 30, about an axis parallel to the central longitudinal axis of the pipeline 16, to adjust the inclination of their contact faces 44 to suit the diameter of the pipeline 16. In each case, the contact faces 44 of the elements 36 lie in opposed planes that are tangential to the outer curvature of the pipeline 16.

Specifically, the elements 36 adopt a relatively steep inclination when supporting a narrower pipeline 16 as shown in FIG. 10b and a relatively shallow inclination when supporting a wider pipeline 16 as shown in FIG. 10c. Accordingly, the substrate layer 32 deflects resiliently to assume a wedge shape, narrowing toward one end and widening toward the opposite end.

FIG. 11 shows that relative movement between the elements 36 of the interface layer 34 also enables the pad 28 to adapt to transient irregularities or fluctuations in the outer diameter of the pipeline 16 as the pipeline 16 moves longitudinally through the tensioner 10. In this respect, FIG. 11 shows the elements 36 moved relative to each other so that the interface layer 34 conforms to a circumferential ridge 46 of the pipeline 16.

The elements 36 of the interface layer 34 are spaced apart from each other by elongate gaps 48 in the form of slits or grooves to provide clearance for their relative movement, especially if one element 36 is tilted out of the plane relative to a neighbouring element 36 as shown in FIG. 11. Also, whilst the elements 36 are substantially cuboidal, they have rounded edges around their contact faces 44 and may also taper slightly from the substrate layer 32 toward the contact face 44, again to provide clearance for relative movement.

Relative movement between the elements 36 of the interface layer 34 can also be used to adjust a pad to suit pipelines of different diameter. In this respect, FIGS. 12 to 14 show a first variant pad 50 in which elongate elements 36 of the interface layer 34 are turned through 90° relative to the pad 28 shown in FIGS. 4 to 11. Thus, the elements 36 extend in a direction orthogonal to the inclination of the back plate 30, hence extending across the slope defined by that inclination, parallel to the central longitudinal axis of the pipeline 16.

FIG. 14 shows that relative movement between the elements 36 of the interface layer 34 allows the contact face 44 of the interface layer 36 to adopt a concave shape that complements the convex curvature of the pipeline 16. This is in addition to tapering of the substrate layer 32 allowing the interface layer 34 to tilt as a whole to suit the diameter of the pipeline 16, akin to the states shown in FIGS. 10b and 10c.

Turning next to FIGS. 15 to 17, these drawings show a second variant pad 52 that is apt to be used in a three- or four-track tensioner as shown in FIG. 3. In such cases, it is advantageous for the contact face 44 of the pad 52 to lie substantially parallel to the longitudinal interface area in which a series of the pads 52 of the tensioner contact the outer surface of the pipeline 16. Thus, the pad 52 lies substantially in a plane that is orthogonal to a radius of the pipeline 16, again being tangential to the outer curvature of the pipeline 16.

In the second variant pad 52 shown in FIGS. 15 to 17, the back plate 30 is substantially cuboidal, with parallel major faces and four rectangular side faces. Consequently, the contact face 44 of the interface layer 34 is substantially parallel to the underside of the back plate 30 and to the links 20 of the track 12.

As in the first variant pad 50 shown in FIGS. 12 to 14, the elements 36 of the interface layer 34 extend in a direction parallel to the central longitudinal axis of the pipeline 16. Thus, as shown in FIG. 17, relative movement between the elements 36 allows the contact face 44 of the interface layer 34 to adopt a concave shape that complements the convex curvature of the pipeline 16. In this instance, the substrate layer 32 does not adopt a wedge shape but instead adopts a waisted shape that is narrowed in a central portion beneath a central element 36 of the interface layer 34 relative to outer portions beneath outer elements 36 of the interface layer 34.

Many other variations are possible within the inventive concept. For example, the elements 36 of the interface layer 34 need not be elongate. To exemplify this, FIG. 18 shows a third variant pad 54 in which the elements 36 are blocks disposed in a two-dimensional matrix array of mutually-intersecting or mutually-orthogonal rows and columns. The elongate gaps 48 between adjacent rows therefore intersect the elongate gaps 48 between adjacent columns. This confers flexibility on the interface layer 34 to bend about mutually-orthogonal axes, hence combining the attributes of the preceding embodiments in being able to adapt to a pipeline that varies in diameter and to different pipelines of different diameter.

Finally, FIGS. 19 and 20 show a fourth variant pad 56 in which the elongate gaps 48 between the elements 36 of the interface layer 34 extend into the substrate layer 32 as slits 58. The slits 58 can extend through the full thickness of the substrate layer 32 as shown on the left or merely through part of the thickness of the substrate layer 32 as shown on the right. Thus, the substrate layer 32 is divided into portions beneath, and corresponding to, the respective elements 36 of the interface layer 34.

A benefit of dividing the substrate layer 32 in this way is to allow an element 36 of the interface layer 34 to deflect independently of the other elements 36, without tilting the other elements 36 out of optimal contact with the pipeline 16. This is apparent in FIG. 20, where the passage of a circumferential ridge 46 of the pipeline 16 depresses the central element 36 of the interface layer 34 relative to the adjacent outer elements 36 of the interface layer 34, without tilting the outer elements 36 out of contact with the pipeline 16.

The invention claimed is:

1. A pad for a track-type tensioner comprises:
   a rigid base plate;
   an interface layer comprising a plurality of rigid elements that together define a contact face of the pad for gripping an elongate product supported by the tensioner in use, wherein the contact face of the pad is substantially planar in a rest state; and
   a substrate layer of pliant material sandwiched between the base plate and the interface layer, the substrate layer supporting the elements of the interface layer for movement relative to each other and relative to the base plate;
   the pad further comprising elongate gaps between adjacent elements of the interface layer, which gaps extend through the full thickness of the interface layer.

2. The pad of claim 1, wherein the elements of the interface layer are elongate and aligned with each other side by side in a direction extending across the contact face.

3. The pad of claim 1, wherein the elements of the interface layer are arranged in a two-dimensional matrix extending across the contact face.

4. The pad of claim 1, wherein the base plate is wedge-shaped, defining an inclined face that supports the substrate layer.

5. The pad of claim 4, wherein the elongate gaps are aligned in a direction extending across a slope of the inclined face.

6. The pad of claim 4, wherein the elongate gaps are aligned in a direction extending down a slope of the inclined face.

7. The pad of claim 1, wherein the substrate layer comprises slits in alignment and communication with the gaps.

8. The pad of claim 1, wherein the elements of the interface layer taper away from the substrate layer.

9. The pad of claim 1, wherein the contact face of the pad comprises three-dimensional patterned or textured surfaces of the elements of the interface layer.

10. The pad of claim 1, wherein the substrate layer extends continuously across the back plate between the elements of the interface layer.

11. The pad of claim 1, wherein the pliant material of the substrate layer is a polymer or rubber.

12. The pad of claim 1, wherein the elements of the interface layer are made of steel or iron.

13. A track-type tensioner comprising a plurality of pads as defined in claim 1, the pads being spaced longitudinally in a direction parallel to a pipeline launch axis defined by the tensioner.

14. The tensioner of claim 13, wherein the elements of the interface layer of each pad are elongate and aligned with each other side by side in a direction extending across the contact face, that direction also being parallel to the pipeline launch axis.

15. The tensioner of claim 13, wherein the elements of the interface layer of each pad are arranged in a two-dimensional matrix extending across the contact face and are aligned in a direction parallel to the pipeline launch axis.

16. The tensioner of claim 13, wherein the elements of the interface layer of each pad are elongate and aligned with each other side by side in a direction extending across the contact face, that direction also being transverse to the pipeline launch axis.

17. The tensioner of claim 13, wherein the elements of the interface layer of each pad are arranged in a two-dimensional matrix extending across the contact face and are aligned in a direction transverse to the pipeline launch axis.

18. The tensioner of claim 13, wherein the base plate is wedge-shaped, defining an inclined face that supports the substrate layer, and wherein the pads are arranged in opposed pairs with their wedge-shaped base plates tapering toward each other.

19. A method of holding back an elongate product being laid into water comprises:
    gripping the product with a plurality of pads of a track-type tensioner, each pad having a contact face defined by a plurality of rigid elements of an interface layer with elongate gaps between adjacent elements extending through the full thickness of the interface layer, wherein the contact face is substantially planar in a rest state; and
    by virtue of squeeze force applied by the tensioner to the product via the pads, moving the rigid elements relative to each other and relative to base plates of the pads to suit an outer shape profile of the product.

20. The method of claim 19, comprising permitting said movement of the rigid elements by distortion of a substrate layer disposed between the rigid elements and the base plate of each pad.

21. The method of claim 19, wherein said movement of the rigid elements relative to the base plate comprises rotation of the rigid elements about an axis parallel to a central longitudinal axis of the product.

22. The method of claim 21, wherein said rotation of the rigid elements changes inclination of the contact face relative to a diametric plane extending through the product.

23. The method of claim 19, wherein said movement of the rigid elements relative to the base plate comprises translation of the rigid elements toward or away from the base plate.

24. The method of claim 19, wherein said movement of the rigid elements relative to each other causes the contact face to assume a concave profile.

25. The method of claim 24, wherein the concave profile matches outer curvature of the product.

26. The method of claim 19, wherein the contact faces of the pads are each generally tangential to an outer curvature of the product.

27. The method of claim 19, comprising:
    gripping a first elongate product in the tensioner by applying squeeze force to the product via the pads;
    releasing the first product from the tensioner; and
    gripping a second elongate product in the tensioner by applying squeeze force to the second product via the same pads, wherein by virtue of said movement of the rigid elements, the pads adapt to the second product having a different diameter to the first product.

* * * * *